United States Patent
Zhang et al.

(10) Patent No.: US 10,316,901 B2
(45) Date of Patent: Jun. 11, 2019

(54) CLUTCH PLATE SEPARATION FOR DRAG LOSS REDUCTION

(71) Applicant: FORD GLOBAL TECHNOLOGIES, LLC, Dearborn, MI (US)

(72) Inventors: Dengfu Zhang, Northville, MI (US); Jau-Wen Tseng, Ann Arbor, MI (US); David Beck, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 257 days.

(21) Appl. No.: 15/293,416

(22) Filed: Oct. 14, 2016

(65) Prior Publication Data
US 2018/0106299 A1  Apr. 19, 2018

(51) Int. Cl.
F16D 13/74 (2006.01)
F16D 13/52 (2006.01)
F16D 13/64 (2006.01)
F16D 13/72 (2006.01)
F16D 25/0638 (2006.01)
F16D 25/12 (2006.01)
F16D 69/00 (2006.01)

(52) U.S. Cl.
CPC ............ F16D 13/74 (2013.01); F16D 13/52 (2013.01); F16D 13/648 (2013.01); F16D 13/72 (2013.01); F16D 25/0638 (2013.01); F16D 25/123 (2013.01); F16D 2069/004 (2013.01); F16D 2300/0214 (2013.01)

(58) Field of Classification Search
CPC .......... F16D 13/52; F16D 13/72; F16D 13/74; F16D 13/648; F16D 25/063; F16D 25/123; F16D 2300/0214; F16D 2069/004
See application file for complete search history.

(56) References Cited

U.S. PATENT DOCUMENTS

| 8,146,725 | B2 | 4/2012 | Miyazaki et al. | |
| 9,097,289 | B2 | 8/2015 | Youngwerth et al. | |
| 2002/0027053 | A1* | 3/2002 | Back | F16H 45/02 192/3.3 |
| 2008/0302625 | A1 | 12/2008 | Takayanagi | |
| 2013/0168199 | A1* | 7/2013 | Higashijima | F16D 13/64 192/107 M |
| 2015/0152923 | A1* | 6/2015 | Youngwerth | F16D 13/648 192/107 R |
| 2016/0025158 | A1* | 1/2016 | Kobayashi | F16D 13/64 192/107 M |

FOREIGN PATENT DOCUMENTS

WO    2014/180478 A1   11/2014

* cited by examiner

Primary Examiner — Jacob S. Scott
Assistant Examiner — Lori Wu
(74) Attorney, Agent, or Firm — David Kelley; Brooks Kushman P.C.

(57) ABSTRACT

According to one or more embodiments, a clutch pack includes a first set of clutch plates arranged in an alternating configuration with a second set of clutch plates. The first set of clutch plates has a plurality of friction pads made of friction material and defining channels in the friction material. The channels are configured to allow lubricant to flow between the friction pads. Each of the friction pads defines a groove in the friction pad. The groove is disconnected from the channels. The groove thereby creates a flow induced high pressure region forcing the first set of clutch plates to a center between the second set of clutch plates.

18 Claims, 3 Drawing Sheets

{}# CLUTCH PLATE SEPARATION FOR DRAG LOSS REDUCTION

TECHNICAL FIELD

The present disclosure relates to friction clutches as used in automotive transmissions. In particular, the disclosure relates to design features to improve clutch plate separation for reducing open-clutch torque drag loss.

BACKGROUND

A vehicle transmission may be shifted between multiple gears by engaging and disengaging friction plates and separator plates in a clutch pack. Clutch plates experience drag torque when in the open-clutch mode because of a narrow gap between separator and friction plates and lubrication fluid between the adjacent plates. Reducing open-clutch drag torque is critical to improving vehicle fuel economy.

SUMMARY

According to embodiments of the present disclosure, a clutch pack is provided. The clutch pack includes a first set of clutch plates arranged in an alternating configuration with a second set of clutch plates. The first set of clutch plates has a plurality of friction pads made of friction material and defining channels in the friction material. The channels are configured to allow lubricant to flow between the friction pads. Each of the friction pads defines a groove in the friction pad. The groove is disconnected from the channels. The groove thereby creates a flow induced high pressure region forcing the first set of clutch plates to a center between the second set of clutch plates.

According to embodiments of the present disclosure, a clutch pack is provided. The clutch pack includes a plurality of separator plates and a plurality of friction plates. The friction plates are intermeshed with the plurality of separator plates. The friction plates have a first plurality of friction pads defining channels configured for lubricant flow between the friction and separator plates. Each of the first plurality of friction pads defines a groove adjacent to the channels, thereby resulting in a high pressure region producing an axial force centering the friction plate between separator plates. The clutch pack may also include a second plurality of friction pads which are grooveless.

A friction plate includes a disc and a plurality of friction pads in friction material attached to the disc. Each of the plurality of friction pads defines a groove in the friction material. The groove is located adjacent to a leading edge of the friction pad, thereby creating a flow induced high pressure region producing an axial force to shift the friction plate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
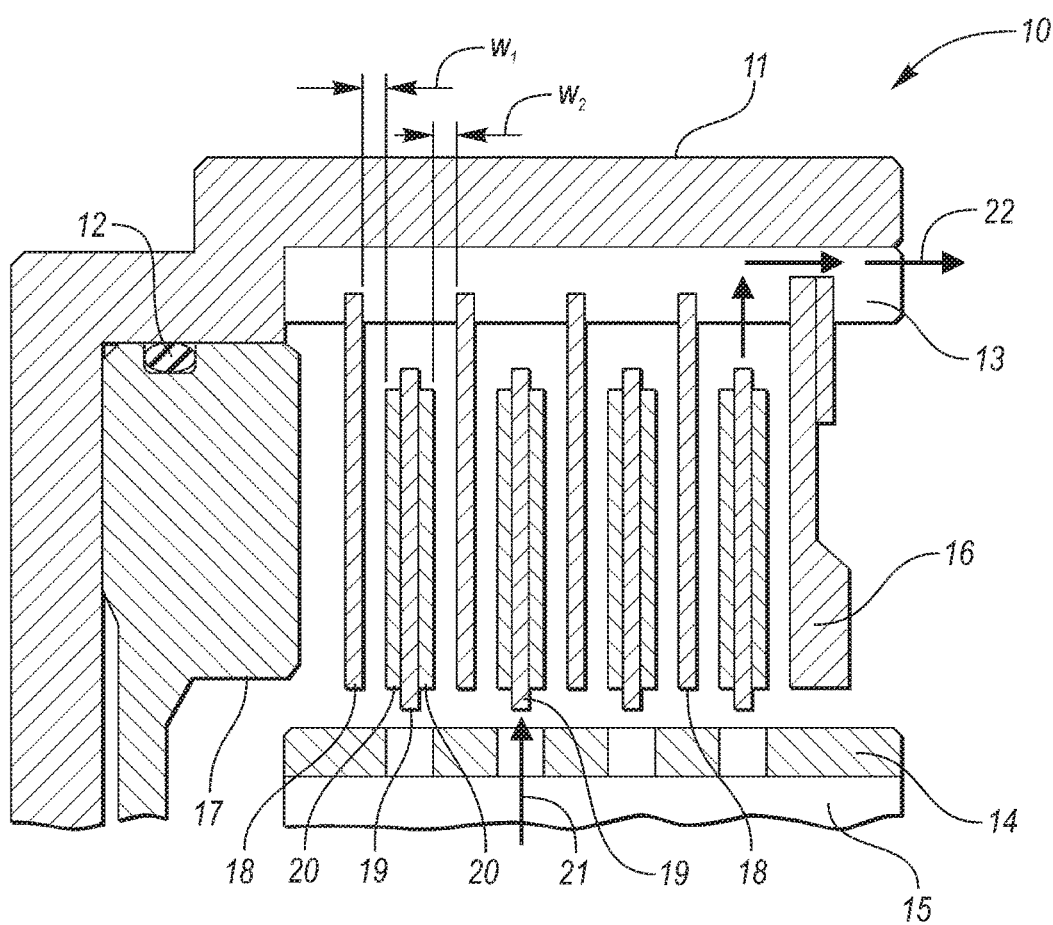
FIG. 1 is a partial axial sectional view of a multi-plate clutch having friction plates of the present disclosure.

Referring to FIG. 1, a wet-type clutch pack 10 is shown disposed in clutch case 11 between the first spline 13 and the second spline 14. Second spline 14 is adjacent to hub 15. The clutch pack of FIG. 1 is a wet-type clutch with piston 17 and seal 12. The clutch pack 10 may be configured to selectively couple the first spline 13 to the second spline 14. The clutch pack 10 may include a plurality of clutch plates. The two types of clutch plates, which are either fixedly secured to the first spline 13 or the second spline 14 (not shown), may be referred to as separator plates 18 and friction plates 19. As shown in FIG. 1, the separator plates 18 are fixedly secured to the first spline 13. The friction plates 19 and separator plates 18 may be arranged in an alternating configuration such that individual friction plates 19 are separated by separator plates 18 and individual separator plates 18 are separated by friction plates 19. A packing plate 16 is located at the end of the clutch pack 10. A first gap $W_1$ is shown between a separator plate 18 and friction plate 19 on the side of the friction plate 19 closer to the piston 17. A second gap $W_2$ is shown between friction plate 19 and another separator plate 18, on the side of the friction plate farther from the piston 17. A fluid, such as oil or lubricant, flows in to the clutch case 11 through first orifice 21 and out through second orifice 22, creating a fluid region between the clutch plates. The friction plates 19 have discs (not shown) with an inner periphery and an outer periphery defining a width therebetween. The discs are coated with friction material 20 on the width of the friction plate 19. Although friction material 20 is shown on both sides of the disc, in some embodiments, the friction material 20 may only be on one side of the disc. In other embodiments, the friction material may be on either type of the clutch plates.

When clutch pack 10 is "open," since it is a wet-type clutch, there is relative movement between clutch plates, resulting in losses due to drag. When the first gap $W_1$ between the friction plates 19 and the separator plates 18 is narrow in open-clutch mode, the observed drag torque losses are higher since the friction plate 19 is biased to one side, and $W_2$ is larger than $W_1$. For example, for centered friction plates with 100% oil film, the theoretical drag torque at 500 rpm is 0.56 Nm. In reality, there is air in the interface as well, so the expected drag torque is even lower. However, testing shows drag torque above 2 Nm, indicating that the friction plates are biased off center. Centering the friction plate reduces drag torque.

According to embodiments, the friction plates 19 are forced to the center between the separator plates 18 by developing a high pressure region on the narrow first gap $W_1$ between the plates. The high pressure region generates a flow-induced axial separation force on the friction plate 19 to push it away from the fixed separator plate 18 and to the center, such that gap $W_1$ and gap $W_2$ are substantially equal, thereby reducing drag loss. The high pressure region generates a greater force on the friction plate 19 when the gap $W_1$ between the friction plate 19 and separator plate 18 is narrower. Thus, the axial force forcing the friction plate 19 to the center increases as the gap $W_1$ narrows. As the width of the gap $W_1$ between the friction plate 19 and separator plate 18 increases, the axial separation force generated is less, as less force is needed to push the plate to the center.

Figure 2A:
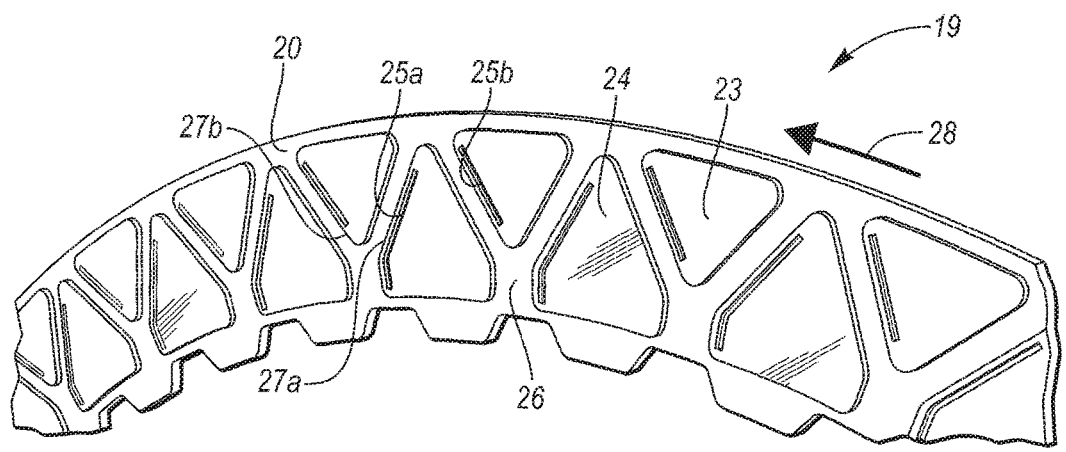
FIG. 2A is a partial front view of a friction plate according to a first embodiment of the present disclosure.
Figure 2B:
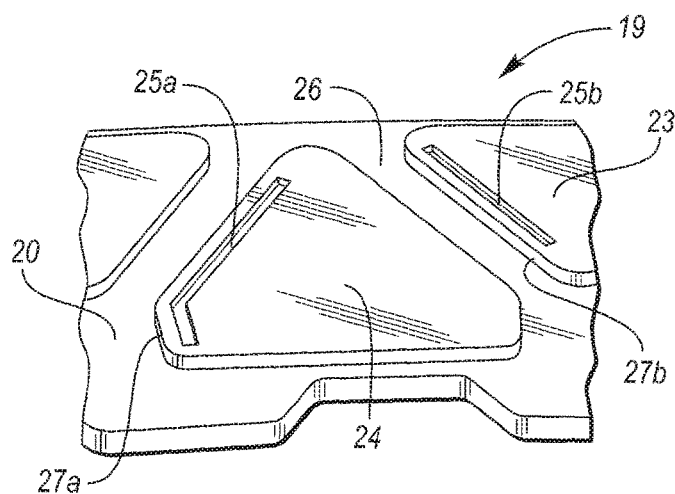
FIG. 2B is a partial perspective view of the friction plate according to the first embodiment of the present disclosure.

Referring to FIGS. 2A and 2B, a first embodiment of friction plate 19 is shown. The friction plate 19 has a disc with an inner and outer periphery. Friction material 20 covers the width of the disc of the friction plate 19. The friction material has raised friction pads 23, 24 radially disposed about the friction plate 19. Non-limiting examples of shapes for the friction pads 23, 24 are shown in FIGS. 2A-B, respectively; however, other shapes or combinations of shapes are also contemplated for the friction pads 23, 24. In this embodiment, two different shapes of friction pads 23,24 are radially disposed in the friction material 20 on the friction plate 19.

Channels 26 are formed in the friction material 20 between the raised friction pads 23 and 24. The channels 26 may be open to one or both peripheries of friction plate 19. Non-limiting examples of the geometry of the channels 26 are shown in FIGS. 2A-B, respectively; however other geometries are also contemplated for the channels 26. The channels 26 provide space for a fluid, such as oil or lubricant, to flow across the friction plate 19.

Each of friction pads 23, 24 has a leading edge 27b, 27a, respectively. The leading edges 27a, 27b are defined on the leading side of each friction pad 24, 23 with respect to a direction of rotation 28. The leading edges 27a, 27b connect a surface of the friction pad 24, 23 with the channels 26, respectively. The shape of the leading edge 27a, 27b varies with the shape of the friction pad 24, 23. Adjacent to the leading edges 27a, 27b, are grooves 25a, 25b in the friction material 20 of each of the friction pads 24, 23. In some embodiments, not all friction pads 24, 23 have a groove, such that some friction pads are grooveless. In a variation, a second set of friction pads is included without grooves (not shown). Non-limiting examples of the shapes of the grooves 25a, 25b are shown in FIGS. 2A and 2B, however, other shapes are also contemplated for the grooves 25a, 25b. In some embodiments, the grooves 25a, 25b are adjacent to the leading edge 27a, 27b. In some embodiments, the grooves 25a, 25b are shaped parallel to the leading edge 27a, 27b. In some embodiments, grooves 25a, 25b are disconnected from channels 26, and therefore are not in fluid communication with the channels 26. In some embodiments, grooves 25a, 25b are disconnected from the inner periphery, the outer periphery, or both (as shown in FIGS. 2A-B). Due to fluid flow against grooves 25a, 25b, a flow induced high pressure region is generated on the friction pads 24, 23 and friction plate 19 is pushed to the center because of a flow induced axial force.

Figure 3A:
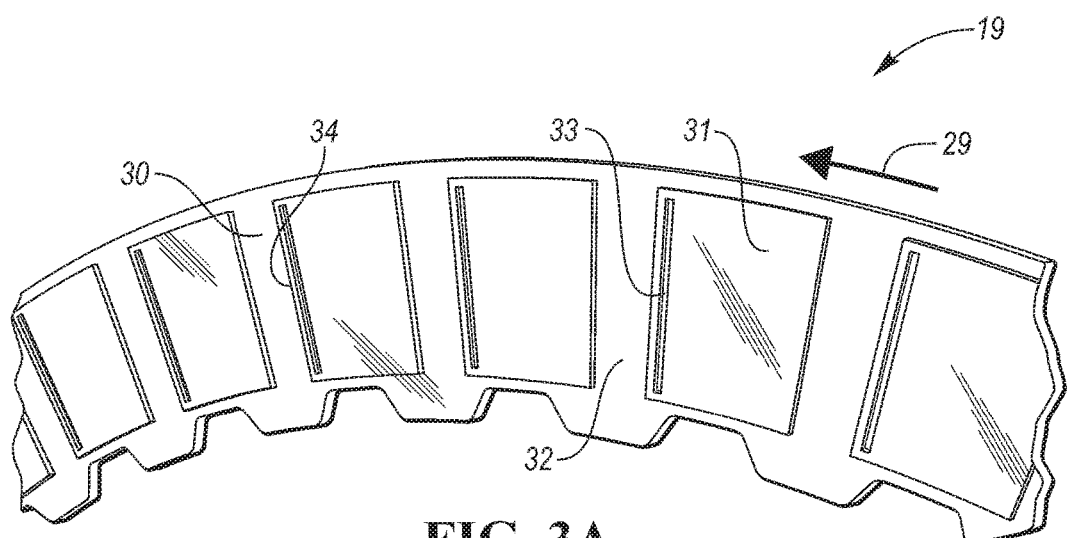
FIG. 3A is a partial front view of the friction plate according to a second embodiment of the present disclosure.
Figure 3B:
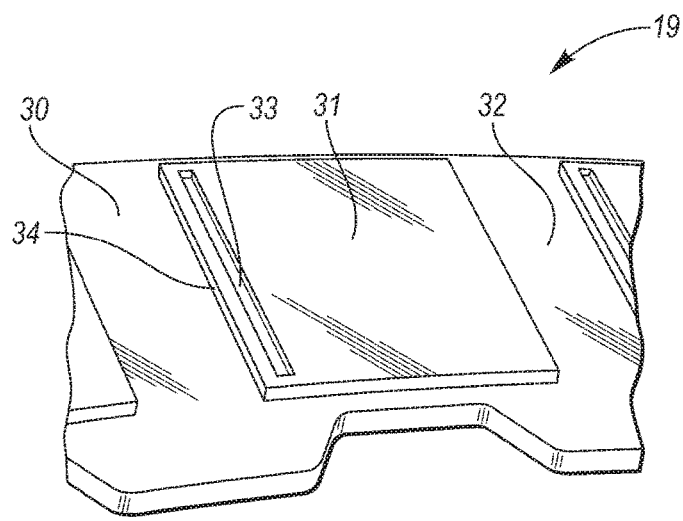
FIG. 3B is a partial perspective view of the friction plate according to the second embodiment of the present disclosure.

Referring to FIGS. 3A and 3B, a second embodiment of friction plate 19 is shown. Friction material 30 covers the width of friction plate 19. The friction material 30 has uniform raised friction pads 31 radially disposed about the friction plate 19. Non-limiting examples of shapes for the friction pads 31 are shown in FIGS. 3A-B, respectively; however, other shapes or combinations of shapes are also contemplated for the friction pads 31. In this embodiment, the friction pads 31 are all configured in the same radial shape. Friction pads 31 are radially disposed in the friction material 30 on the friction plate 19.

Channels 32 are formed in the friction material 30 between the radial friction pads 31. The channels 32 may be open to one or both peripheries of friction plate 19. Non-limiting examples of the geometry of the channels 32 are shown in FIGS. 3A-B, respectively; however other geometries are also contemplated for the channels 32. The channels 32 provide space for a fluid, such as oil or lubricant, to flow across the friction plate 19.

Each of friction pads 31 has a leading edge 34. The leading edge 34 is defined on the leading side of each friction pad 31 with respect to a direction of rotation 29. The leading edge 34 connects a surface of the friction pad 31 with the channels 32. The shape of the leading edge 34 varies with the shape of the friction pad 31. Adjacent to the leading edge 34 is groove 33 in the friction material 30 of each friction pad 31. In some embodiments, not all friction pads 31 have a groove 33, such that some friction pads are grooveless. In a variation, a second set of friction pads is included without grooves (not shown). A non-limiting example of the shape of the groove 33 is shown in FIGS. 3A and 3B, however other shapes are also contemplated for the groove 33. In some embodiments, the groove 33 is adjacent to the leading edge 34. In some embodiments, the groove 33 is shaped parallel to the leading edge 34. In some embodiments, groove 33 may be disconnected from channels 32, and therefore is not in fluid communication with the channels 32. In some embodiments, groove 33 may be disconnected from the inner periphery, outer periphery, or both (as shown in FIGS. 3A-B). Due to fluid flow against groove 33, a flow induced high pressure region is generated on the friction pads 31 and friction plate 19 is pushed to the center because of a flow induced axial force.

According to the embodiments, the grooves can be configured to have a shape, size, or a width and depth, capable of creating a flow-induced axial separation force to push the friction plate to the center. The groove is sized to create a high pressure region, resulting in an axial force, in the gap $W_1$ between the friction plate 19 and separator plate 18. In some embodiments where friction material 20 is on both sides of the disc, the centering axial force can be formed in the gap $W_2$ due to a high pressure region on the friction pads on the other side of the friction plate 19. The width and depth of the groove can be varied based on the size and geometry of the friction pads such that the axial separation force produced is capable of pushing the friction plate to the center. As a non-limiting example, if the friction pad width is approximately 10 mm wide, the groove width is approximately 0.5 mm and the groove depth is approximately 0.25 mm.

The groove dimensions may also be based on a ratio between groove width and friction pad width and/or groove depth. The ratio is based on the high pressure region generated by the fluid contacting the groove to generate an axial separation force capable of pushing the friction plate to center. As a non-limiting example, the ratio ranges from about 1:2 to 1:40 for either of the groove width to friction pad width or groove width to groove depth. Based on the measurements in the previous non-limiting example, the ratio of friction pad width to groove width is 1:20; and the groove depth to groove width ratio is 1:2. In a variation, the ratio for either of the groove width to friction pad width or groove width to groove depth is between about 1:4 to 1:40. In another variation, the ratio for either of the groove width to friction pad width or groove width to groove depth is between about 1:8 to 1:40.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A clutch pack comprising:
a first set of clutch plates arranged in an alternating configuration with a second set of clutch plates, the first set of clutch plates having a plurality of friction pads made of friction material and defining channels in the friction material around a periphery of the pads, configured to allow lubricant to flow around and between the friction pads,
wherein each of the friction pads defines a groove in the friction pad disconnected from the channels, thereby creating a flow induced pressure region forcing the first set of clutch plates to a center between the second set of clutch plates.

2. The clutch pack of claim 1, wherein the friction material is on both sides of each plate of the first set of clutch plates.

3. The clutch pack of claim 1, wherein the groove is adjacent to a leading edge of the friction pad.

4. The clutch pack of claim 1, wherein the groove is sized such that an axial force forcing the first set of clutch plates to the center increases when a gap between one of the first set of clutch plates and one of the second set of clutch plates narrows.

5. The clutch pack of claim 1, wherein a ratio of groove width to friction pad width is between 1:2 to 1:40.

6. The clutch pack of claim 1, wherein a ratio of groove depth to groove width is between 1:2 to 1:40.

7. A clutch pack comprising:
a plurality of separator plates; and
a plurality of friction plates intermeshed with the plurality of separator plates and having a first plurality of friction pads defining channels around a periphery of each of the friction pads configured for lubricant flow between the friction and separator plates, each of the friction pads defining a groove adjacent to and disconnected from the channels forming a pressure region producing an axial force centering the friction plate between separator plates.

8. The clutch pack of claim 7 further comprising a second plurality of friction pads defining channels configured for lubricant flow between the friction and separator plates, wherein the second plurality of friction pads are grooveless.

9. The clutch pack of claim 7, wherein the groove is shaped according to a leading edge of the friction pad.

10. The clutch pack of claim 7, wherein each groove is sized such that the axial force increases when a gap between the friction plate and separator plate narrows.

11. The clutch pack of claim 7, wherein each of the plurality of friction pads has a leading edge with respect to a direction of rotation which connects a surface of the friction pad with the channels, and the groove on each of the plurality of friction pads is in the surface of the friction pad adjacent to the leading edge.

12. The clutch pack of claim 7, wherein the plurality of friction pads are disposed on both sides of each of the friction plates.

13. A friction plate comprising:
a disc; and
a plurality of friction pads in friction material attached to the disc, each of the plurality of friction pads defining a groove in the friction material disconnected from channels defined around a periphery of the friction pad, the groove being located adjacent to a leading edge thereby creating a flow induced pressure region producing an axial force to shift the friction plate.

14. The friction plate of claim 13, wherein the groove is parallel to the leading edge.

15. The friction plate of claim 13, wherein the groove is sized such that the axial force increases when a gap between the friction plate and a separator plate narrows.

16. The friction plate of claim 13, wherein the friction material is attached to both sides of the disc.

17. The friction plate of claim 13, wherein a ratio of groove width to friction pad width or groove depth to groove width is between 1:2 to 1:40.

18. The friction plate of claim 13 further comprising a second plurality of friction pads in the friction material, wherein friction pads of the second plurality of friction pads are grooveless.

* * * * *